United States Patent Office 3,076,923
Patented Feb. 5, 1963

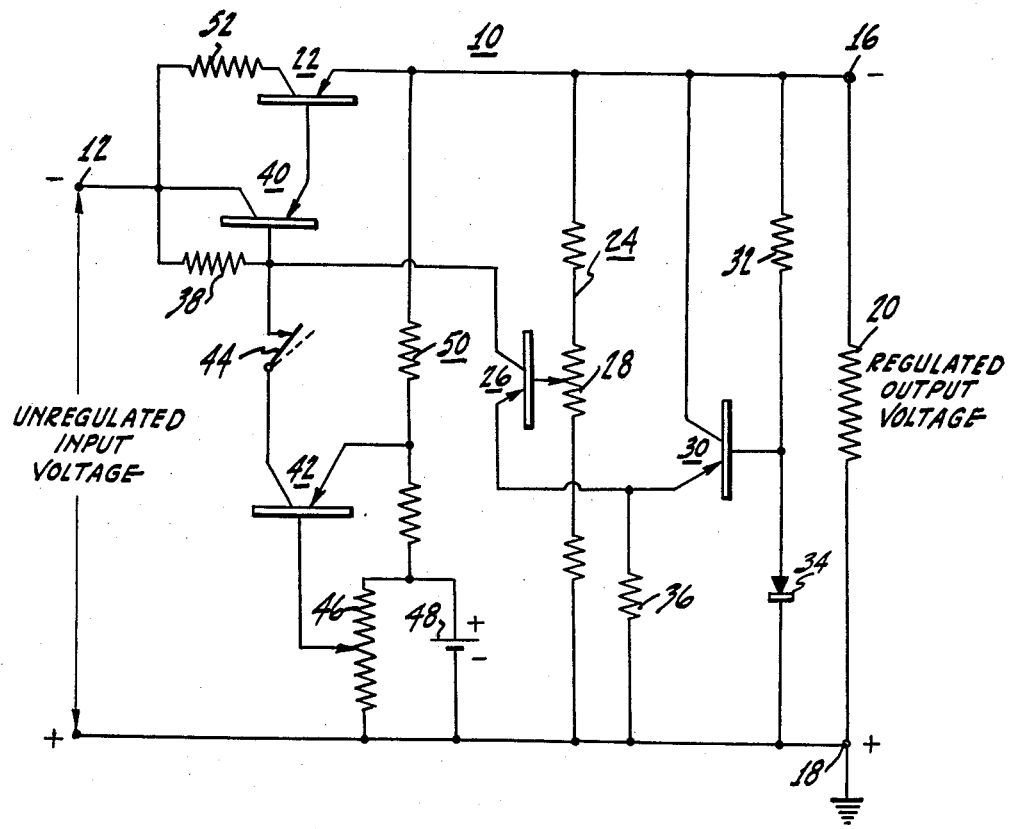
INVENTOR.
DONALD J. POITRAS
BY
ATTORNEY

3,076,923
OVERLOAD PROTECTIVE CIRCUIT
Donald J. Poitras, Haddonfield, N.J., assignor to Radio Corporation of America, a corporation of Delaware
Filed Jan. 2, 1959, Ser. No. 784,579
4 Claims. (Cl. 323—22)

This invention relates generally to regulated power supplies, and more particularly to improved circuit means associated with a unidirectional voltage regulating circuit for protecting a load on a power supply.

The overload protective circuit of the present invention is particularly useful in a transistorized, regulated power supply for protecting both the load and the transistors of the power supply in the event of a short circuit at the output terminals of the power supply.

It had been proposed to protect regulated power supplies against overloads and short circuits by employing zener diodes in a manner whereby the zener diodes would conduct in the event of an overload. These zener diodes served to bleed off excess current and thereby protected the load and the transistors of the power supply. In such prior art protective circuits, however, the power supply would become operative immediately upon the removal of the cause of the excessive overload. If the cause of the overload had been intermittent, the power supply employing prior art protective circuits would also have operated intermittently.

Accordingly, it is an object of the present invention to provide a novel protective circuit for protecting a transistorized, regulated power supply from overloads.

Another object of the present invention is to provide an improved protective circuit for a transistorized, regulated power supply that will cut off current to the load by applying a reverse bias potential to the series and driver transistors of the regulatory circuit.

Still another object of the present invention is to provide an improved protective circuit for a transistorized, regulated power supply that must be manually reset after a short circuit has occurred across the output terminals of the power supply before the power supply can be returned to normal operation.

A further object of the present invention is to provide an improved overload protective circuit for a transistorized power supply that is relatively simple in construction and operation, and yet is highly efficient in use.

In accordance with the present invention, the foregoing objects and related advantages are attained in an improved overload protection circuit that may be incorporated in a typical, transistorized, regulated power supply. This novel overload protection is accomplished electronically by switching a reverse bias potential to the pass and driver transistors of the regulating circuit and cutting them off, in the event of an overload. After the overload on the power supply has been removed, the power supply may be returned to normal operation by operating a manually operated reset button.

The novel features of the present invention, as well as the invention itself, both as to its organization and methods of operation will be understood in detail when considered in connection with the accompanying drawing in which the single FIGURE represents a schematic drawing of a transistorized voltage regulating circuit employing the overload protective circuit of the present invention.

Referring, now, to the drawing, there is shown a transistorized voltage regulating circuit 10 having a negative input terminal 12 and a positive input terminal 14 adapted to receive a source of unregulated, unidirectional voltage. The regulating circuit 10 is provided with a negative output terminal 16 and a positive output terminal 18 for supplying a regulated output voltage to a load, represented herein as a resistor 20. The positive input terminal 14 in connected directly to the positive output terminal 18 and to a common connection, such as ground.

A series transistor 22, or a pass transistor, as it is sometimes called, has its collector connected to the negative input terminal 12 through a resistor 52, and its emitter connected to the negative output terminal 16. The series transistor 22 may be considered a variable impedance whose impedance is controlled by a voltage on its base electrode.

Means are provided to sample the amplitude of the output voltage between the terminals 16 and 18 and to feed the sampled voltage back degeneratively to the base of the transistor 22 to vary its impedance in accordance with the amplitude of the output voltage. To this end, a voltage divider 24 is connected between the output terminals 16 and 18. A sample of the output voltage is sensed by the base of a transistor 26, connected to a tap of a potentiometer 28 that forms a part of the voltage divider 24. The emitter of the transistor 26 is connected to the emitter of a transistor 30.

The transistors 26 and 30 are connected to each other in a differential amplifier circuit. The collector of the transistor 30 is connected to the negative output terminal 16, and the base of the transistor 30 is connected to the negative output terminal 16 through a resistor 32. The base of the transistor 30 is also connected to the positive output terminal 18 through a zener diode 34. It will now be understood that the base of the transistor 30 is maintained at a constant voltage determined by the breakdown voltage across the zener diode 34.

The emitters of the transistors 26 and 30 are also connected to the positive output terminal 18 through a common cathode resistor 36. The collector of the transistor 26 is connected to the negative input terminal 12 through a load resistor 38. It will now be understood that, in accordance with the operation of a conventional differential amplifier, any change in the voltage at the base of the transistor 26 is sensed and compared to the voltage across the zener reference diode 34. Changes in voltage between the zener reference voltage at the base of the transistor 30 and the voltage at the base of the transistor 26 result in current changes in the transistors 26 and 30. If, for example, the current were to increase through the transistor 26, then the current would decrease through the transistor 30 by approximately an equal amount, whereby the current through the resistor 36 would tend to remain approximately constant.

Changes in voltage at the base of the transistor 26 are applied degeneratively to the base of the transistor 22 through an amplifying transistor 40. Thus, the collector of the transistor 26 is connected to the base of the transistor 40. The emitter of the transistor 40 is connected to the base of the transistor 22, and the collector of the transistor 40 is connected to the negative input terminal 12. It will now be understood that the transistor 40 is an amplifier, or sometimes called a driver, for signals fed back from the output voltage, to vary the impedance of the transistor 22.

In the event of an overload, such as a short across the output terminals 16 and 18, means are provided to reverse bias the transistors 40 and 22 so that they will cease to conduct and thereby cut off current to the load 20. The overload protective circuit comprises a transistor 42 having a collector electrode connected to the base electrode of the transistor 40 through a normally closed switch 44. The base electrode of the transistor 42 is connected to a variable tap on a potentiometer 46. The resistor of the potentiometer 46 is connected across a separate source of unidirectional voltage 48. The negative terminal of the voltage source 48 is connected to the positive output terminal 18, and the positive terminal of the voltage source 48 is connected to the negative terminal 16 of the power supply through a voltage divider 50. The emitter electrode of the transistor 42 is connected to a tap on the voltage divider 50. It will now be understood that, by adjusting the variable tap on the potentiometer 46, it is possible to bias the transistor 42 to cut-off so that the transistor 42 will be non-conducting during normal operation of the regulator circuit 10.

Under conditions of conduction of the transistor 42, it will be understood that the positive voltage at the base electrode of the transistor 42 will be applied to the base electrode of the transistor 40 and to the base electrode of the transistor 22. Under these conditions, the transistors 40 and 22 will be biased to cut-off and no current will flow to the load 20.

The operation of the overload protective circuit of the present invention will now be explained. Under normal conditions of operation, the switching transistor 42 will be biased to cut-off by biasing the base electrode of the transistor 42 more positive than the emitter electrode of the transistor 42. The power supply will now be regulated by the regulating circuit 10 in the usual manner. Changes in the output voltage of the regulator circuit will be sensed at the base of the transistor 26, amplified, and fed back degeneratively to the base electrode of the driver transistor 40. Thus, if the output voltage between the terminals 16 and 18 decreases, a negative signal will be fed back to the base electrodes of the transistors 40 and 22 and will decrease the impedance of these transistors so that more current will be conducted to the load 20. This action will tend to restore the output voltage to its regulated value. Conversely, any rise in the output voltage of the regulator circuit will result in a positive output signal being fed back to the electrodes of the transistors 40 and 22, whereby their impedance will be increased. Under these latter conditions, less current will flow to the load, and the voltage across the load will be restored to its regulated value.

Let it now be assumed that there is a sudden short circuit between the output terminals 16 and 18. The output voltage will now drop due to increased current through (1) the impedance between the terminal 16 and the terminal 12 provided by the resistance of the resistor 52 and the resistance of the transistor 22, and (2) the internal impedance of the unregulated power supply. Since the positive output terminal 18 is connected to the common connection, ground, the voltage at the output terminal 16 will become more positive. This positive-going voltage is sensed by the emitter electrode of the switching transistor 42. Since the bias at the base electrode of the switching transistor 42 is fixed, it will now be understood that when the emitter electrode of the switching transistor 42 becomes sufficiently positive, it will start conducting current and saturate. Since the difference in potential between the base electrode and the collector electrode of the saturated transistor 42 is only a fraction of a volt, the positive potential of the base electrode of the switching transistor will be applied to the base electrodes of the driving transistor 40 and of the series transistor 22. This positive voltage will reverse bias the transistors 40 and 22, and they will cease conducting, thereby preventing damage to the load 20 and to themselves.

Once the transistors 22 and 40 have been reversed biased so that they have ceased to conduct, due to the saturation of the switching transistor 42, they will not start conducting upon the removal of the short between the output terminals 16 and 18. This results from the structure wherein the reverse bias potential on the base electrodes of the transistors 40 and 22 is derived from a separate source of voltage 48, independent of the unregulated input voltage.

If the trouble causing the short circuit between the output terminals 16 and 18 has been removed, and if it is desired to apply a regulated output voltage to the load 20 again, the normally closed switch 44 may be opened momentarily and then closed again. The dashed position of the switch 44 shows the switch in its open position. Thus, by momentarily opening the switch 44 and then closing it, the independent source of reverse biasing potential is removed from the transistors 40 and 22 and current may again flow through the load 20. This feature enables the operator to investigate the cause of the short, and to assure himself of the fact that the power supply will not begin operating until the short is removed.

From the foregoing description, it will be apparent that there has been provided an improved overload protective circuit that is operable in typical, series regulated, transistorized power supplies. While the protective circuit, according to the invention, has been shown in diagrammatic form, various components useful therein, as well as variations in the system itself coming within the spirit of this invention, no doubt, will readily suggest themselves to those skilled in the art. Hence, it is desired that the foregoing example shall be considered merely as illustrative and not in a limiting sense.

What is claimed is:

1. In a power supply of the type wherein a source of unregulated voltage is applied to a pair of input terminals of a regulator circuit, wherein a regulated output voltage for a load is derived between a pair of output terminals of said regulator circuit, and wherein a sample of said output voltage is fed back degeneratively to a control electrode of a variable impedance device connected in series between one of said input terminals and one of said output terminals to control said impedance in accordance with variations in said output voltage; a second source of unidirectional voltage, said second source of voltage being independent of said source of unregulated voltage, means including a voltage divider connecting said second source between said pair of output terminals, a transistor, means connecting the emitter-collector path of said transistor between said voltage divider and said control electrode and means connecting the base electrode of said transistor to said second source of voltage to bias said transistor to cut off during normal operation of said power supply and to cause said transistor to conduct when the output voltage of said power supply falls below a predetermined amplitude, whereby said biasing voltage will be applied to said control electrode to cause said impedance of said device to become infinite.

2. In a power supply of the type wherein a source of unregulated voltage is applied to a pair of input terminals of a regulator circuit, wherein a regulated output voltage for a load is derived between a pair of output terminals of said regulator circuit, and wherein a sample of said output voltage is fed back degeneratively to a control electrode of a variable impedance device connected in series between one of said input terminals and one of said output terminals to control said impedance in accordance with variations in said output voltage, means including a voltage divider to connect a second source of unidirectional voltage in series with said pair of output terminals, said second source of voltage being independent of said source of unregulated voltage, a transistor, means connecting the current path between input and output electrodes of said transistor between said voltage divider and said control electrode, and means to apply a voltage from said second source of voltage to a common electrode of said transistor to bias said transistor to cut off during normal operation of said power supply and to cause said transistor to conduct when said output terminals of said power supply are shorted, whereby said biasing voltage will cause said impedance of said device to become infinite.

3. In a power supply of the type wherein a source of unregulated unidirectional voltage is applied to a pair of input terminals of a regulator circuit, wherein a regulated output voltage for a load is derived between a pair of output terminals of said circuit, and wherein a sample of said output voltage is fed back degeneratively to a base electrode of a series transistor whose collector-emitter path is connected between one of said input terminals and one of said output terminals to vary the impedance of said series transistor in accordance with variations in said output voltage; means for reverse biasing said series transistor in the event of an overload between said output terminals comprising a switching transistor, means including a second source of voltage independent of said source of unregulated unidirectional voltage to bias the base electrode of said switching transistor with a voltage that would normally drive said series transistor to cut off, means connecting the emitter-collector path of said switching transistor between said one of said output terminals and said base electrode of said series transistor, said last-mentioned means comprising means to cause said switching resistor to be non-conductive during normal output voltages of said power supply and to conduct when said output voltage falls below a predetermined amplitude.

4. In a power supply of the type wherein a source of unregulated unidirectional voltage is applied to a pair of input terminals of a regulator circuit, wherein a regulated output voltage for a load is derived between a pair of output terminals of said circuit, and wherein a sample of said output voltage is fed back degeneratively to a control electrode of a series transistor whose input electrode-output electrode path is connected between one of said input terminals and one of said output terminals to vary the impedance of said series transistor in accordance with variations in said output voltage; means for reverse biasing said series transistor in the event of an overload between said output terminals comprising a switching transistor, means including a second source of voltage independent of said source of unregulated unidirectional voltage to apply a bias to a control electrode of said switching transistor with a voltage that would normally drive said series transistor to cut off, means connecting the input electrode-output electrode path of said switching transistor between said one of said output terminals and said control electrode of said series transistor, said last-mentioned means comprising means to cause said switching transistor to be non-conductive during normal output voltages of said power supply and to conduct when said output voltage falls below a predetermined amplitude.

References Cited in the file of this patent

UNITED STATES PATENTS

| | | |
|---|---|---|
| 2,776,382 | Jensen | Jan. 1, 1957 |
| 2,832,900 | Ford | Apr. 29, 1958 |
| 2,888,632 | Livezey | May 26, 1959 |
| 2,888,633 | Carter | May 26, 1959 |
| 2,904,742 | Chase | Sept. 15, 1959 |
| 2,922,945 | Norris | Jan. 26, 1960 |

OTHER REFERENCES

"Designing Transistor Circuits," R. B. Hurley, Electronic Equipment, April 1957, pages 20–23.